United States Patent [19]
Åberg

[11] Patent Number: 5,749,991
[45] Date of Patent: May 12, 1998

US005749991A

[54] METHOD OF AFFIXING A TUBULAR OBJECT

[75] Inventor: Kenneth Åberg, Täby, Sweden

[73] Assignee: Niblick International AB, Taby, Sweden

[21] Appl. No.: 571,843

[22] PCT Filed: Apr. 22, 1994

[86] PCT No.: PCT/SE94/00359

§ 371 Date: Apr. 10, 1996

§ 102(e) Date: Apr. 10, 1996

[87] PCT Pub. No.: WO95/00595

PCT Pub. Date: Jan. 5, 1995

[30] Foreign Application Priority Data

Jun. 23, 1993 [SE] Sweden ................... 9302167

[51] Int. Cl.$^6$ .................. A63B 53/14; B29C 63/06; B29C 63/18; C09J 7/02
[52] U.S. Cl. .................. 156/187; 156/191; 156/294; 156/306.6; 156/327; 428/40.7; 428/41.5; 428/355 R; 428/355 AC
[58] Field of Search .................. 156/294, 306.6, 156/327, 187, 191; 473/300, 301; 428/40.7, 41.5, 355, 355 R, 355 AC

[56] References Cited

U.S. PATENT DOCUMENTS

| | | | |
|---|---|---|---|
| 3,096,202 | 7/1963 | Groot Von Arx | 428/355 |
| 3,556,835 | 1/1971 | Sorell | 425/355 |
| 3,843,397 | 10/1974 | Olson | 428/355 |
| 3,915,782 | 10/1975 | Davis et al. | 156/294 |
| 4,328,269 | 5/1982 | Korpman | 428/355 |
| 4,439,344 | 3/1984 | Albanese | 252/312 |
| 4,505,976 | 3/1985 | Doehnert et al. | 428/355 |
| 4,569,960 | 2/1986 | Blake | 428/355 |
| 5,258,088 | 11/1993 | Wu | 156/294 |
| 5,281,288 | 1/1994 | Murray et al. | 156/594 |
| 5,288,359 | 2/1994 | Stobbie | 156/294 |
| 5,419,797 | 5/1995 | Ciamaga et al. | 156/289 |
| 5,429,703 | 7/1995 | Hartman et al. | 156/294 |
| 5,609,932 | 3/1997 | Goetz et al. | 156/294 |

FOREIGN PATENT DOCUMENTS 0439259  7/1991  European Pat. Off.
1209679  10/1970  United Kingdom.

*Primary Examiner*—Steven D. Maki
*Attorney, Agent, or Firm*—John Lezdey

[57] ABSTRACT

The present invention discloses a method of and composition for bonding a tubular first object to an inwardly located second object by using an adhesive coating. The coating includes water, a glue and a polymer. The coating is preferably applied to the inner surface of the first object and is dried so that the object may be stored for years prior to use. When ready for use, the coating is activated by wetting it with water so that the first tubular object can easily slide along the outer surface of the inwardly located second object to a desired position. The present invention further teaches a handgrip bonded to a golf club using the method described above.

14 Claims, No Drawings

METHOD OF AFFIXING A TUBULAR OBJECT

BACKGROUND OF THE INVENTION

1. Field of the Invention

The present invention relates to a method of affixing a first hollow object or part to a second object or part with the aid of an internal layer of binding agent. In this regard, the invention relates in particular to a handgrip which is intended to be fitted to the shaft of a golf club, and also to a golf club having such a handgrip fitted thereto.

2. Description of the Prior Art

Hitherto known methods for affixing tubular plastic objects or tubular elastomeric objects onto other objects in which the outwardly lying object is secured through the medium of an intermediate coating have been difficult to apply in practice, particularly when desiring a tight fit at the interface or boundary surface between the outwardly lying and the inwardly lying objects to be joined.

The adhesives used to bond materials together when at least one of the materials concerned is a polymeric material normally contain a certain amount of solvent. In some cases, a certain amount of plastic material is dissolved when bonding said materials together, resulting in a molecular bond between glue joint and substrate. In those cases when the polymer is not attacked by solvent, there is used, among others, a contact adhesive, although in this case solely an adhesive bond is obtained between the said materials. However, this type of adhesive also includes a powerfully acting solvent.

EP Patent Application No. 0,439,259 (publication date Jul. 31, 1991) discloses an example of glue-based bonding between an elastomer and a metal. In this case, a relatively strong bond is obtained with the metal substrate, by coating the substrate with a primer in the form of epoxydized diene-polymer and a phenol resin. In addition to the primer, there is used a bonding agent in the form, e.g., of a halogenated rubber adhesive or glue, while ketones are preferably used as a solvent.

When concerning the production of the articles mentioned in the introduction and comprising a separate, outwardly lying tubular object which has been tightly fitted to a centrally located object, such as a shaft for instance, it is not necessary to produce a glue joint which exhibits a molecular bonding action or some other form of strong anchorage against one of the objects or substrate surfaces, provided that fixation of the outwardly lying object is achieved by utilizing the tensioning forces that are generated by said outwardly lying object. In this regard, strong glue joints can be obtained by, for instance, coating the shaft or the outwardly lying object with a bonding agent which has a sticking function. Nevertheless, when practicing prior art methods it is necessary, in the majority of cases, to use a glue which has a high organic solvent concentration, so as to reduce the frictional forces acting between shaft and outwardly lying object when fitting the object to the shaft.

SUMMARY OF THE INVENTION

It has now surprisingly been found that a glue-product which has a good sticking capacity when dry can be produced by mixing a specific, highly adhesive glue with a preferably polytetrafluoroethylene based substance. The glue is coated on one of the objects and allowed to dry. The glue coating on the product can be activated whenever desired, by bringing the coating into contact with water, even after the object has been left in storage for several years. The water makes the surface very slippery, therewith greatly reducing the frictional properties of the surface and the surface will become very sticky when the water has evaporated.

The invention enables the objects to be readily bonded together, even when the space available for applying the glue is practically non-existent and the tubular object is already in place on the inwardly lying object.

DESCRIPTION OF THE PREFERRED EMBODIMENTS

It will be readily understood that the inventive method can be applied in any relevant field of use. For instance, the invention can be applied with pipes made of rubber or some other material and fitted onto another pipe and where a proper and reliable bond between the two pipes is desired. The method can also be applied to different handgrips, preferably with handgrips which have a manoeuvering or control function, such as in the leisure sector, for instance cycle handlebar grips and rubber handgrips for golf clubs, these handgrips having been treated with an activatable glue product in accordance with the invention at their place of manufacture. When the end customer wishes to fit the handgrips/handles, he/she need only rinse the internal surfaces of the handgrips/handles with water and then slide them into position on the handlebars or the golf club and then wait for the water to evaporate.

The method basic to the present invention includes a method of affixing a first tubular single-piece object, preferably an elastomeric object, to a second, single-piece object, which may be tubular or solid, preferably made of metal or an elastic or non-elastic polymeric material with a tight fitting between the inner surface of the first object and the outer surface of the second object with the aid of an adhesive, said method being characterized by (a) producing a liquid mixture containing up to 70 percent by weight water and a remaining part which comprises 15–95 percent by weight of a specific water-dilutable glue and 5–85 percent by weight of a dispersion which contains a polymer having low friction properties, preferably a polymer based on fluorinated alkylene monomers, particularly a homopolymer or co-polymer of the polytetrafluoroethylene type, so as to obtain a composition which exhibits an adhesive effect at a low or non-existent water content and which exhibits low frictional properties at: high water contents;

(b) applying the liquid mixture uniformly to the inner surface of the first object and allowing the mixture to dry;

(c) subsequent to drying the inner coating, and optionally after having kept the first object in storage, applying water to said inner coating in an amount corresponding to up to 100 parts by weight, preferably 1–80 parts by weight of the inner coating, particularly by pouring water into the tubular hollow of the first object, thereby activating the coating and obtaining a coating surface of low frictional properties; and (d) sliding the first object into a desired position on the outer surface of the second object and allowing the coating to dry, therewith obtaining an adhesively acting coating surface.

According to one aspect, the inventive method is applied to a handgrip which is intended to be attached to the shaft of a golf club and which is made of an elastomeric material, preferably rubber, and is characterized in that the inner surface of the handgrip is coated with a thin coating layer which has a low water content or contains no water at all, and which is comprised of 15–85 percent by weight adhesive substance and 15–50 percent by weight of a fluoropolymeric substance, preferably a fluorinated alkylene polymer, and particularly a polytetrafluoroethylene homopolymer or copolymer having a molecular weight of at most 30000, wherein the coating layer having a low or non-existent water content after being applied to shaft, which is preferably comprised of chromium coated steel or reinforced polyester, has a stickiness of about 0.3N/cm or higher according to the ASTM test D-429-B, and a sliding friction or so-called skating coefficient of about 0.01–0.3 subsequent to activating the coating surface with water.

The adhesive product used in accordance with the present invention provides significant advantages over earlier known techniques, not least with regard to environmental care and protection, since the use of organic solvents can be completely dispensed with when gluing the two objects together.

Hitherto, a typical method of fitting handgrips to golf clubs, either in conjunction with large scale manufacturing processes or when repairing -damaged clubs, involves wrapping the upper part of the club shaft with double-sided adhesive tape and treating the tape with an organic solvent in order to reduce the friction generated thereby, whereafter the handgrip can be threaded onto the club shaft. Subsequent to adjusting the handgrip positionally on the shaft the handgrip is allowed to dry, thereby bonding thehandgrip to the sticky tape surface.

This method is encumbered with serious drawbacks. In addition to cost, mainly caused by the time consumed by the complicated procedure required to fit the handgrip, the method also leaves a lot to be desired from an environmental aspect, since it requires the use of hazardous thinning agents.

The aforedescribed conventional method of fastening rubber handgrips to golf clubs is used to a relatively large extent. Other methods are used to a lesser extent. For instance, mechanical dilation methods are used in which the handgrip is dilated or expanded radially prior to being fitted, with the aid of pneumatic processes. Because of the mechanical properties of the rubber, primarily its toughness, which greatly restrict the manageability of the handgrip, the mechanical dilation methods do not afford any significant production advantages, among other things because of the high plant costs entailed.

Nevertheless, the present invention employs the concept of fitting a rubber handgrip to golf clubs with the aid of double-sided adhesive tape, since this tape is used traditionally on a large scale in both the manufacturing stage and in the repair of golf clubs and is therefore a sought-for product. A tape product that has been produced in accordance with the invention is particularly attractive because one surface of the tape can be made active with water so as to reduce the surface frictional properties thereof. With a starting point from this aspect of the invention, there is proposed a method of fastening a single-piece handgrip to the shaft of a golf club with a tight fit between the inner surface of the handgrip and the outer surface of the shaft with the aid of an adhesively active intermediate layer, said method being characterized by (a) preparing a liquid mixture which comprises up to 70 percent by weight water and a remaining part which is comprised of 15–95 percent by weight water-thinnable glue and 5–85% by weight of a dispersion which -contains a polymer having low frictional properties, preferably on the basis of fluorinated alkylene monomers, particularly of the polytetrafluoroethylene type, wherein the resultant composition exhibits an adhesive action at a low or nonexistent water content and low frictional properties at a high water content;

(b1) applying the liquid mixture uniformly to one side of a single-sided or double-sided adhesive tape and allowing the tape to dry, wherein the other side of the tape exhibits its original adhesive property;

(b2) winding the tape treated in accordance with (b1) above around the shaft of a golf club with the surface treated in accordance with (b1) above facing outwards, said tape optionally having been placed in storage prior hereto;

(c) applying water to the tape wound round the club shaft so as to activate the composition, such that the side of the tape coated in accordance with (b1) obtains low frictional properties, wherein the weight ratios between water and coating lie within the range of about 100:1–1:1 during the activation stage; and (d) sliding the handgrip into its desired position along the taped outer surface of the shaft and allowing the surface coating to dry and therewith obtain adhesive properties.

The invention also relates to a double-sided tape which is characterized in that it is provided with a thin coating layer which has a low or non-existent water content and which comprises 15–85% by weight glue substance and 15–50% by weight fluoropolymer, preferably fluorinated alkylene polymer and particularly a homopolymer or co-polymer of the polytetrafluoroethylene type having a molecular weight of at most 30,000, wherein at a low or non-existent water content, the coating layer exhibits a stickiness of about 0.3N/cm or higher when the tape is subjected to a conventional flaking test, and a sliding friction coefficient of about 0.01–0.3 with regard to rubber surfaces subsequent to activating the coating layer with water.

Glue products which contain a polytetrafluoroethylene type polymer, water and an active glue substance are known to the art, for instance from Japanese Patent Publications JP 01-275686 and JP 61-166843. In this regard, the polytetrafluoroethylene is used, among other things, as a sealing material and imparts improved durability to the glue. These Japanese publications, however, do not teach the particular method of allowing the glue to dry to stickiness and, after storing the surface coating, activate the coating with water to obtain sliding properties and vice versa, and is not thought to be possible with the glue products taught by these publications.

The outer, tubular object which is to be affixed to a second object in accordance with the invention is normally comprised of an elastomeric material, preferably rubber. By rubber is meant here, for instance, natural rubber, synthetic polyisoprene rubber, polybutadiene, nitrile rubber and chloroprene rubber, and the term is also meant to include rubber material in the form of co-polymers, for instance SBR rubber (styrene-butadiene rubber), EPDM rubber (ethylene-propylene diene rubber), butyl rubber, and so on. In this regard, the invention includes any natural or synthetic elastomeric material that can be used for the purpose intended, irrespective of whether the invention is applied to fit a handgrip to a golf club or for some other purpose. In addition to the aforesaid classic rubbers based on monomers having conjugated double bonds, the invention also includes silicone rubber, ethylene-propylene rubber and urethane rubber. The term rubber also includes different rest rubber materials which include, for instance, cork fillers. The recited materials are preferably of a cross-linked type with a starting point from the elastic nature of the materials. The materials preferred with regard to golf club handgrips are particularly isopropene rubber, chloroprene rubber, EPDM rubber, commercially available rest rubber material, and silicone rubber.

The second object, which may be solid or hollow, can be made of any organic or inorganic material and may be elastic or inelastic, although it will preferably be made of a polymer-based or metal-based moulded product, this term including products made of such metals as steel and brass. Particularly when applying to golf club shafts, the shaft will be made of any material that exhibits sufficient rigidity/resiliency for its intended purpose subsequent to having fitted the internally coated object thereto. This includes normal metal shafts, shafts of special steel, chromium coated steel, titanium alloys and shafts made of plastic reinforced with glass fibres, boron fibres, carbon fibres, graphite fibres, etc., preferably reinforced polyester plastic. Shaft materials of a more unconventional type, such as wood and brass for instance, are also included.

The polymer having low frictional properties that is included in the intermediate layer which is not adhesively active until the objects are fitted together in addition to a specific glue component, is preferably comprised of tetrafluoroethylene polymeric substance (PTFE), this term including a tetrafluorohomopolymeric substance and copolymers of tetrafluoroethylene and other monomers, such as polyethylenetetrafluoroethylene and tetrafluoroethylene polymers in which the fluoroatom is substituted with other halogen atoms, for instance polychlorotrifluoroethylene. The term also includes polyfluoroethylenepropylene for instance.

With regard to the sliding ability of the outwardly lying object when fitting said object in place, particularly advantageous results have been achieved when using a low friction polymer in an amount of about 5–40 percent by weight, preferably about 5–20 percent by weight in a preferably colloidal dispersion, particularly on the basis of PTFE. In this regard, there is preferably used a polar solvent/dispersant, such as, for instance, acetone, trichloroethylene or trifluoroethylene, wherein trichloroethylene is preferred. It will be understood that freon-type solvents/dispersants can also be used, although in this case the mixing procedure/coating procedure will preferably be carried out in a closed or sealed atmosphere. The dispersing particles and the theoretically solubilized polymer will preferably have a molecular weight distribution of about 400–30,000, particularly of about 1,000–16,000, while the particle size will preferably be 0–100 μm, particularly 0–20 μm (for instance, Teflon®, manufactured by DuPont). The dispersant will preferably include a small amount of water. Advantageous results are obtained when the total dispersion component is included in the remaining part of the mixture according to (a) in an amount corresponding to 10–50 percent by weight. The specific glue component, which is included in the manufacture of the glue product intended for the surface coating in addition to the polymer having low frictional properties, shall exhibit adhesive properties when dry, even in the case of high low-friction-polymer contents, partly with regard to the inner surface of the outwardly lying object and partly with respect to the outer surface of the inwardly located object. The glue component in the remaining part of the mixture according to (a) will preferably be present in an amount exceeding 50 percent by weight.

With a starting point from the various materials that can be joined together in accordance with the invention, it is possible, in principle, to use all synthetic, semi-synthetic and natural glues, provided that (1) the glue component and the low friction polymer dispersion can be combined with water;

(2) the glue component after being diluted with water can be combined with the low friction polymer dispersion; and (3) the glue component has an adhesive effect on the substrate concerned when the mixture contains no water or has a low water content with a given quantity of low friction polymer, and that the adhesive action will be excluded when a larger amount of water is present.

A particularly good adhesive effect is obtained in the absence of water or with a low water content when the specific glue component is comprised of press-sensitive products in which the tension forces of the outwardly lying object are utilized, as mentioned in the aforegoing. In this regard, the active substance in the press-sensitive glues can include in particular and for instance one or more of the polymers caoutchouc, polyvinyl plastics, alkyd resins, polystyrene, polyisobutene and ethyl cellulose, natural resins, such as cholophonium and petroleum resins, etc., of the coumarone and indene type, and when applicable softening agent, wherein in the majority of cases, the press-sensitive properties are related to functional groups which are carried by the active substance. As an example of those functional groups associated with the press-sensitive adhesive effect of rubber material can be mentioned in particular ester groups such as acrylate and acetate. In this regard, also included, for instance, are acetal groups, such as butyral and alcohol groups and ether groups. The polar groups normally exhibit an adhesive effect on metals and reinforced polyesters for instance.

Good results have been achieved, particularly when fitting handgrips to golf clubs, with a mixture which comprises roughly equal parts of vinyl glue as a specific glue component having the aforesaid functional groups, and a trichloroethylene-based colloidal dispersion containing low-molecular polytetrafluoroethylene as the low friction additive and when applying and storing the liquid mixture and assembling the objects in accordance with the above steps (b) to (d). After applying the mixture of glue and low friction polymer to the inner surface of the handgrip, the conditioning time/drying time is normally from between a few days and up to about four weeks, depending on air ventilation conditions and temperature conditions, whereafter the glued product is obtained. After activating/fitting the glue-coated product, a drying time of about one calendar day is required to adequately fix the objects together. It is not always necessary to admix the glue component and the low friction component prior to applying the mixture to one of the objects to be joined. Acceptable adhesion can also be obtained when the glue component and water are first applied as a first coating layer to the object, followed by applying the low friction component in the form of a second, outwardly lying layer. After drying, there is obtained a water-activatable coating which includes the two, possibly contaminated layers, thereby enabling the second object, to which water has been applied, to be pushed onto the first, inner object. After renewed drying of the objects, the objects are mutually fixed and firmly bonded to one another. Only a relatively short water-contact time is required to activate the glue surface and a contact time in the order of one or a few seconds is sufficient in the majority of cases, although, when necessary, the composition can be optimized so as to achieve contact times of up to five minutes without impairing the end result.

As will be understood, if desired, the water-activatable coating can be applied to the inwardly located second object, for instance a shaft. This is suitable when fitting small metal pipes into large outer objects. It is normally necessary to apply the activatable composition to the outer object, since the activatable layer can therewith be protected against external influences, dust, etc.

As mentioned in the introduction, the invention also includes the possible use of double-sided tape coated with a water-activatable coating in accordance with the invention when fitting handgrips to golf clubs. In this case, the double-sided tape is wound around the club shaft thereby providing the water-activatable coating on the inwardly located object, i.e. the club shaft.

As will be understood, the water-activatable coating on the outer surface of the double-sided tape will adhere to the base material of the tape and that the other tape surface will exhibit particular adhesion to the club shaft.

The press-sensitive products described in the aforegoing are particularly suited for use in this regard as a glue component in both the water-activatable coating and the coating surface which adheres to the club shaft.

The concentration of low friction polymer in the water-activatable coating on the object concerned, i.e. the object which is normally intended to form the outer coating surface, may vary within wide limits. However, since excessively high concentrations of low friction polymer will impair the drying properties of the glue subsequent to assembly, the concentration of low friction polymer will preferably not exceed 50% calculated on the weight of the water-free coating for practical reasons (the drying time should not be unreasonably long).

It has been found that very good sticking values can be obtained by optimizing the part-quantities of the various components when producing the liquid mixture according to (a) and optimizing the drying conditions after coating in accordance with (b) subsequent to activating with water according to (c) followed by fixating the respective objects and drying in accordance with (d), on the basis of the ASTM test D-429-B, after a drying time of one calendar day, the flaking strength based on a flaking angle of 45° is at least about 0.3N/cm. This corresponds to acceptable fixation of the handgrip to the club shaft, and this value can increase to beyond 2N/cm in the passage of time, enabling values of up to about 10N/cm and even higher to be achieved.

The surface of the coating is extremely slippery even after a brief contact with water according to (c) above. The coefficient of friction in movement (sliding friction coefficient) will be at most about 0.3–0.5, although a value of about 0.01–0.3 is preferred. A value lying within this range is obtained with a content of about 15 percent by weight friction polymer on the basis of dry weight.

The invention will now be described in more detail with reference to a number of examples. The percentile additions are based on weight, unless otherwise specified. The composition of the glue products is optimized with regard to respective elastomers.

EXAMPLE 1

There was used in this Example a 10-liter reaction vessel equipped with thermostat and stirrer. 1.5 liters of a water-based vinyl glue ("Skating Adhesive®", an industrial glue comprising an acrylate co-polymer and an acetate copolymer, manufactured by CASCO) were delivered to the reaction vessel. At a temperature of 24° C., 1.5 liters of colloidal 15% PTFE ("Teflon®", manufacturer DuPont) were delivered to the vessel over a period of one minute while stirring the vessel contents. An homogenous dispersion was obtained after stirring for a further seven minutes or thereabouts. The resultant glue product was applied to the tubular surface of a natural rubber golf handgrip with the aid of a cylindrical applicator, such as to obtain a uniform coating on the inner surface of the golf handgrip. The thus treated golf handgrip was conditioned under good air ventilating conditions for about two weeks, to obtain a final handgrip product provided with a dry water-activatable coating. The hollow of the tubular handgrip was then filled with water so as to activate the conditioned and dried coating, the amount of water used corresponding to about 80 parts by weight for each part by weight coating, whereafter the water was immediately emptied from the handgrip. The handgrip was then slid onto the steel shaft of a golf club and fine adjustments made to the position of the handgrip on the club. The handgrip-provided club was ready for use after drying-out for one calendar day.

EXAMPLE 2

The same method of procedure was followed as that described in Example 1, although with the difference that the obtained glue product was applied to the internal surface of a tubular chloroprene handgrip intended for the shaft of a golf club. After conditioning for fifteen calendar days, the dry internal coating was activated with water in the proportions of 80 parts by weight water for each part by weight coating. Subsequent to emptying out the water, the handgrip was slid onto a golf club having a graphite shaft, i.e. a polyester shaft reinforced with a graphite filler. Fine adjustments were then made to the position of the handgrip on the club and the handgrip-provided club was ready for use after drying-out for one calendar day.

EXAMPLE 3

The same method of procedure as that described in Example 1 was followed but with the difference that instead of incorporating 1.5 liters of colloidal PTFE-solution in 1.5 liters of vinyl glue dispersion, only 0.5 liters of colloidal PTFE-solution was added. A homogeneous dispersion was obtained after stirring for a further five minutes or thereabouts. The resultant glue product was applied to an EPDM-handgrip with a cylindrical applicator whose outer diameter was insignificantly smaller than the cylindrical hollow of the EPDM-handgrip. After conditioning for fifteen calendar days, there was obtained a dried inner-surface coating which could be activated with water. A tubular coating surface was obtained by enclosing water in the handgrip tubular and after emptying out the water the handgrip could be slid onto a chromium-plated steel shaft of a golf club and the handgrip then finely adjusted. A drying time of about one calendar day was required.

Investigating Storability of the Glue Product

Three internally coated golf handgrips were prepared in accordance with each of the above Examples 1–3 and were dried for twelve calendar days under good air-ventilating conditions.

The resultant handgrips with an internal water-free coating were subjected to accelerated aging by placing the handgrips in a heating cabinet which was maintained at a constant temperature of 70° C.

After a conditioning time of one week at 70° C. in the heating cabinet, the three golf handgrips were removed and water was poured into the tubular hollows of the handgrips, whereupon it was established that the internal coating of all handgrips was still activatable, i.e. the surfaces exhibited sufficiently low friction to enable them to be slidably fitted. Subsequent to being fitted, it was found that sufficiently effective adhesion was obtained already after one calendar day.

The accelerated aging to which the handgrips were subjected at 70° C. indicates on the basis of standards applied, for instance, in the conventional testing of glue products and adhesives that the storage capacity of the glue composition is at least one year.

I claim:

1. A system comprising a handgrip intended to be attached to a shaft of a golf club and an adhesive, said handgrip having an inner surface and an outer surface, said adhesive comprising about 15 to 85 percent by weight of a water-soluble glue and about 15 to 50 percent by weight of a low molecular weight tetrafluoroethylene polymer; wherein said adhesive is capable of being applied to said shaft so as to give a sticking capacity of about at least 0.3N/cm in accordance with ASTM test D-429-B; and wherein when said adhesive is wetted with water, said wetted adhesive gives a sliding friction coefficient of about 0.1 to 0.3 which facilitates sliding said handgrip on to said shaft.

2. The handgrip according to claim 1, wherein said handgrip comprises a rubber selected from the group consisting of natural rubber, rubber including a cork filler, isoprene, chloroprene, chloropropylene, ethylene-propylenediene, silicone, butyl, butadiene, nitrile, styrene-butadine, ethylene-propylene, and urethane.

3. The handgrip according to claim 2, wherein said handgrip comprises rubber including a cork filler.

4. A method of bonding a first single-piece tubular object to a second single-piece tubular or solid object with an adhesive coating therebetween, each object having an inner surface and an outer surface, said method comprising the steps of:

(a) providing said adhesive coating by admixing up to about 70 percent by weight of water, 15–95 percent by weight of a water soluble glue comprising a vinyl copolymer composition having a vinyl acetate group and an acrylate group and 5–85 percent by weight of a polymer dispersion containing a tetrafluoroethylene polymer having a molecular weight distribution of 500 to 30000;

(b) depositing said adhesive coating on the inner surface of said first tubular object;

(c) drying said inner adhesive coating on said first tubular object;

(d) wetting said inner adhesive coating by depositing water on said inner adhesive coating in an amount up to 100 parts by weight of said adhesive coating;

(e) sliding said first tubular object into a desired position on the outer surface of said second object, and (f) drying said inner adhesive coating so as to form a bond between said first and second objects.

5. The method according to claim 4, wherein said first tubular object comprises an elastomeric material.

6. The method according to claim 5, wherein said second object comprises an elastomeric material.

7. The method according to claim 5, wherein said glue is selected from the group consisting of a vinyl acetate co-polymer, a vinyl acrylate co-polymer and mixtures thereof.

8. The method according to claim 5, wherein said dispersion includes water and a polar organic solvent.

9. The method according to claim 8, wherein said polar organic solvent comprises a solvent selected from the group consisting of acetone, trichloroethylene, trifluoroethylene, and freon.

10. The method according to claim 4, wherein said second object comprises a material selected from the group consisting of a metal and a polymer.

11. The method according to claim 4, wherein said water deposited on said inner adhesive coating in step (d) comprises up to about 80 parts by weight of said inner adhesive coating.

12. A golf club comprising a handgrip and a shaft wherein said handgrip and said shaft are bonded together in accordance with the method of claim 4.

13. A method of bonding a first single-piece tubular object to a second single-piece tubular or solid object with an adhesive coating therebetween, each object having an inner surface and an outer surface, said method comprising the steps of:

(a) providing said adhesive coating by admixing up to about 70 percent by weight of water, 15–95 percent by weight of a water soluble glue comprising a vinyl copolymer composition having a vinyl acetate group and an acrylate group and 5–85 percent by weight of a polymer dispersion containing a tetrafluoroethylene polymer having a molecular weight distribution of 500 to 30,000;

(b) depositing said adhesive coating on one side of an adhesive tape;

(c) drying said adhesive coating on said adhesive tape;

(d) winding said adhesive tape in step (c) around said second object with the side containing said adhesive coating facing outwards;

(e) wetting said adhesive coating by depositing water on said adhesive coating in an amount up to 100 parts by weight of said adhesive coating;

(f) sliding said first tubular object into a desired position on the outer surface of said second object, and (g) drying said adhesive coating so as to form a bond between said first and second objects.

14. The method according to claim 13, wherein said adhesive tape comprises a tape selected from the group consisting of single-sided tape and double-sided tape.

* * * * *